United States Patent [19]

Renda

[11] Patent Number: 4,635,786
[45] Date of Patent: Jan. 13, 1987

[54] ORIENTATION SECTION OF PACKING APPARATUS

[75] Inventor: Frank A. Renda, Hummelstown, Pa.

[73] Assignee: Hershey Foods Corporation, Hershey, Pa.

[21] Appl. No.: 690,848

[22] Filed: Jan. 11, 1985

[51] Int. Cl.⁴ ............................................. B65G 47/26
[52] U.S. Cl. ...................................... 198/424; 198/461
[58] Field of Search ...................... 198/424, 461, 465.3

[56] References Cited

U.S. PATENT DOCUMENTS 2,775,336 12/1956 Rockwell ............................ 198/424
3,263,543 8/1966 Vassalli ............................. 198/465.3
4,257,514 3/1981 Ver Mehren ....................... 198/461

FOREIGN PATENT DOCUMENTS 105894 3/1965 Norway ............................... 198/424

Primary Examiner—Joseph E. Valenza
Assistant Examiner—Kyle E. Shane
Attorney, Agent, or Firm—Paul & Paul

[57] ABSTRACT

A conveyor passes across the exit end of a dryer through which strips of lasagna have passed carried on a succession of stick feeders. The conveyor is divided into a succession of narrow flights defined by upstanding push fingers. Mounted above the flight conveyor at the exit end of the dryer are a series of parallel tiltable shelves or flippers each having a width corresponding to a conveyor flight. Each of the stick feeders as it emerges from the dryer lays a group, for example, twenty-four U-shaped lasagna strips in parallel across the series of flippers. The stick feeder is then withdrawn through the open end of the U-shaped lasagna strip and the flippers are tilted to allow the lasagna strips to slide down into the conveyor flights. A friction belt moving at a speed faster than that of the conveyor assists in pulling the lasagna strips from the flippers and into the conveyor flights.

13 Claims, 5 Drawing Figures

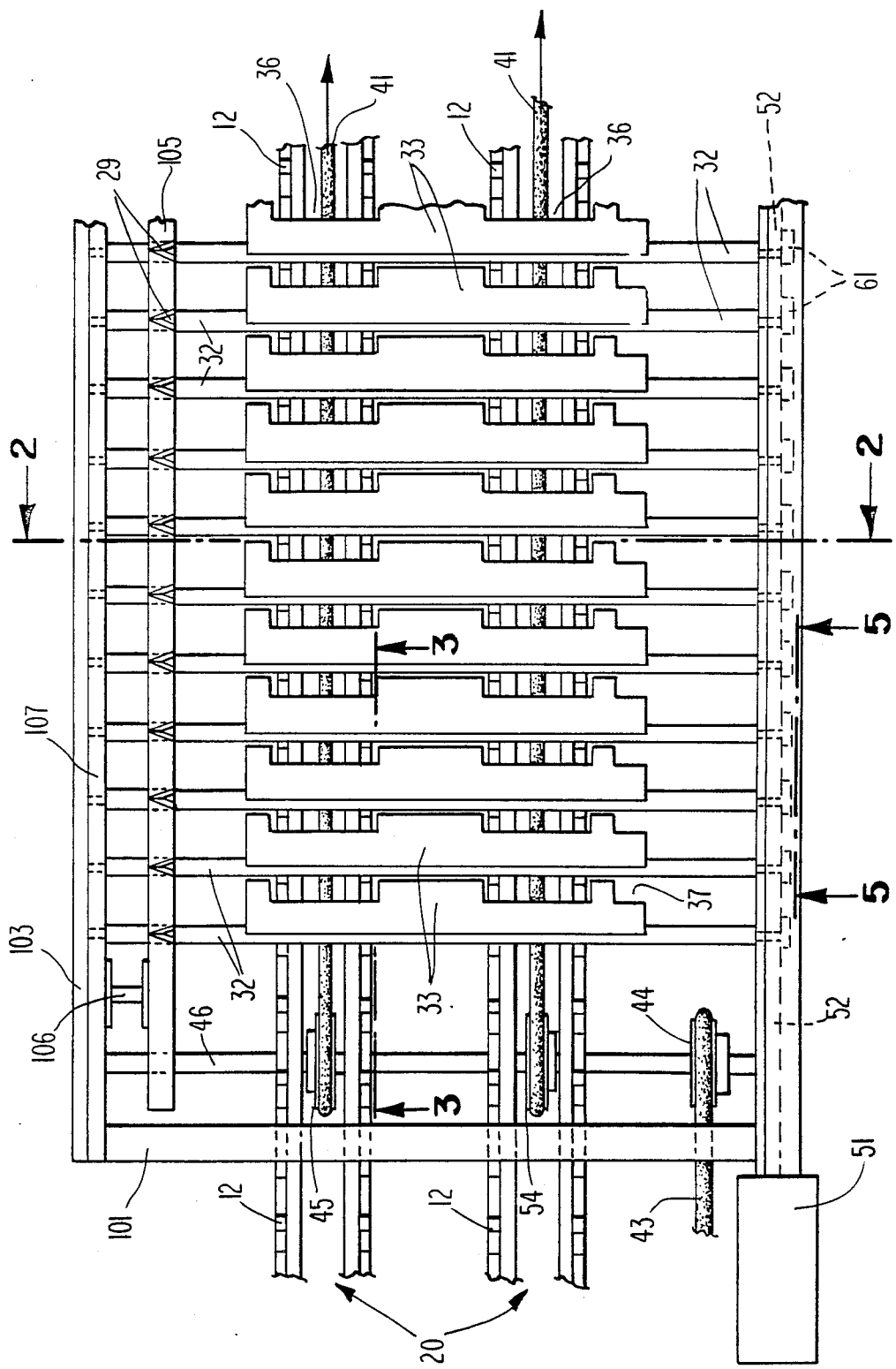

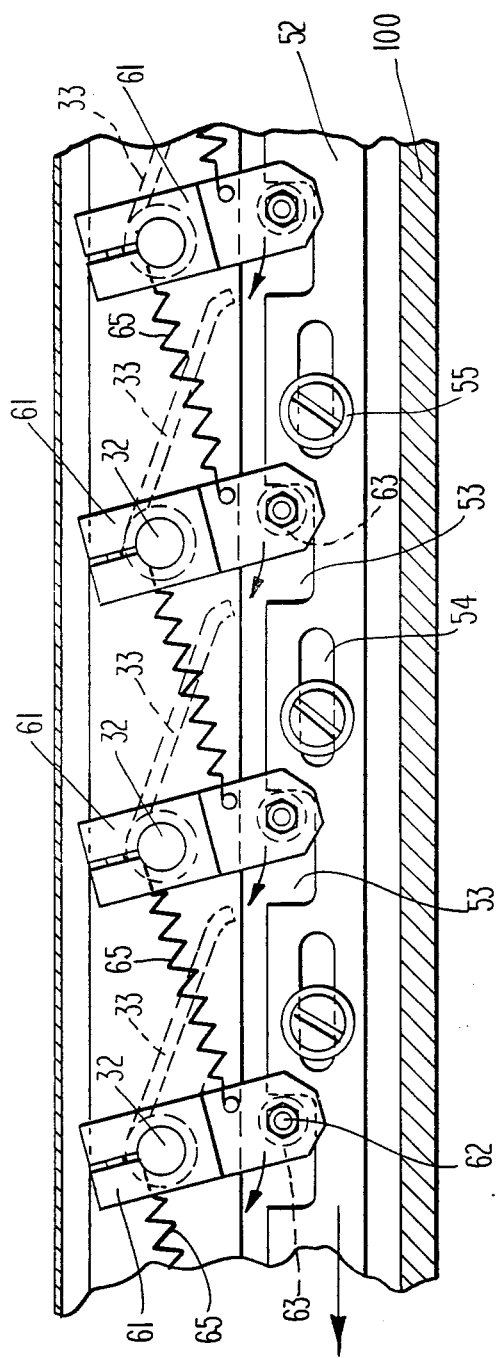
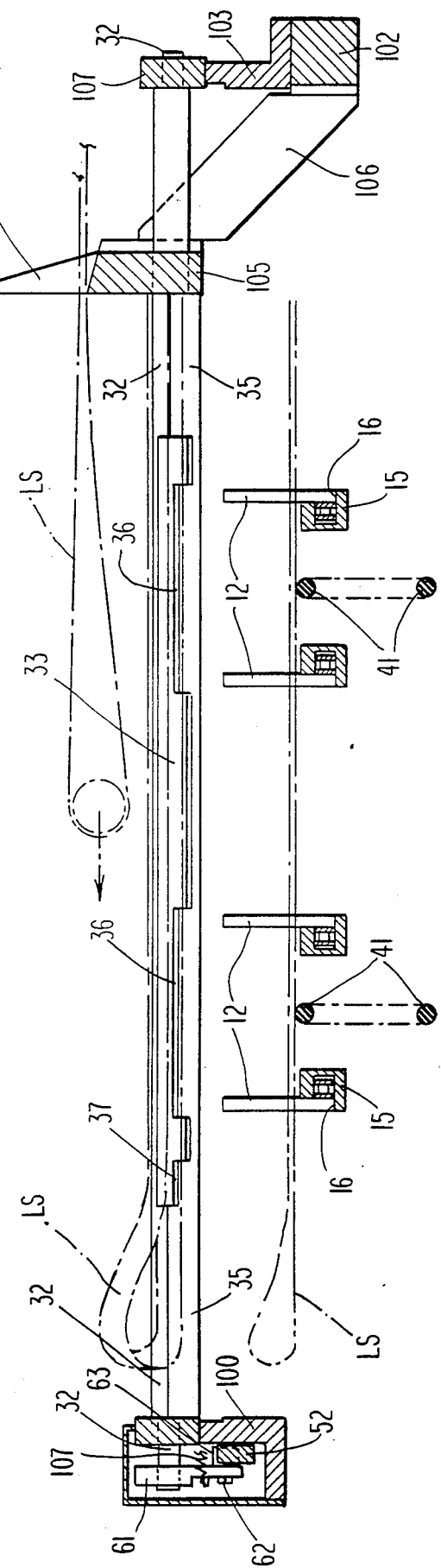

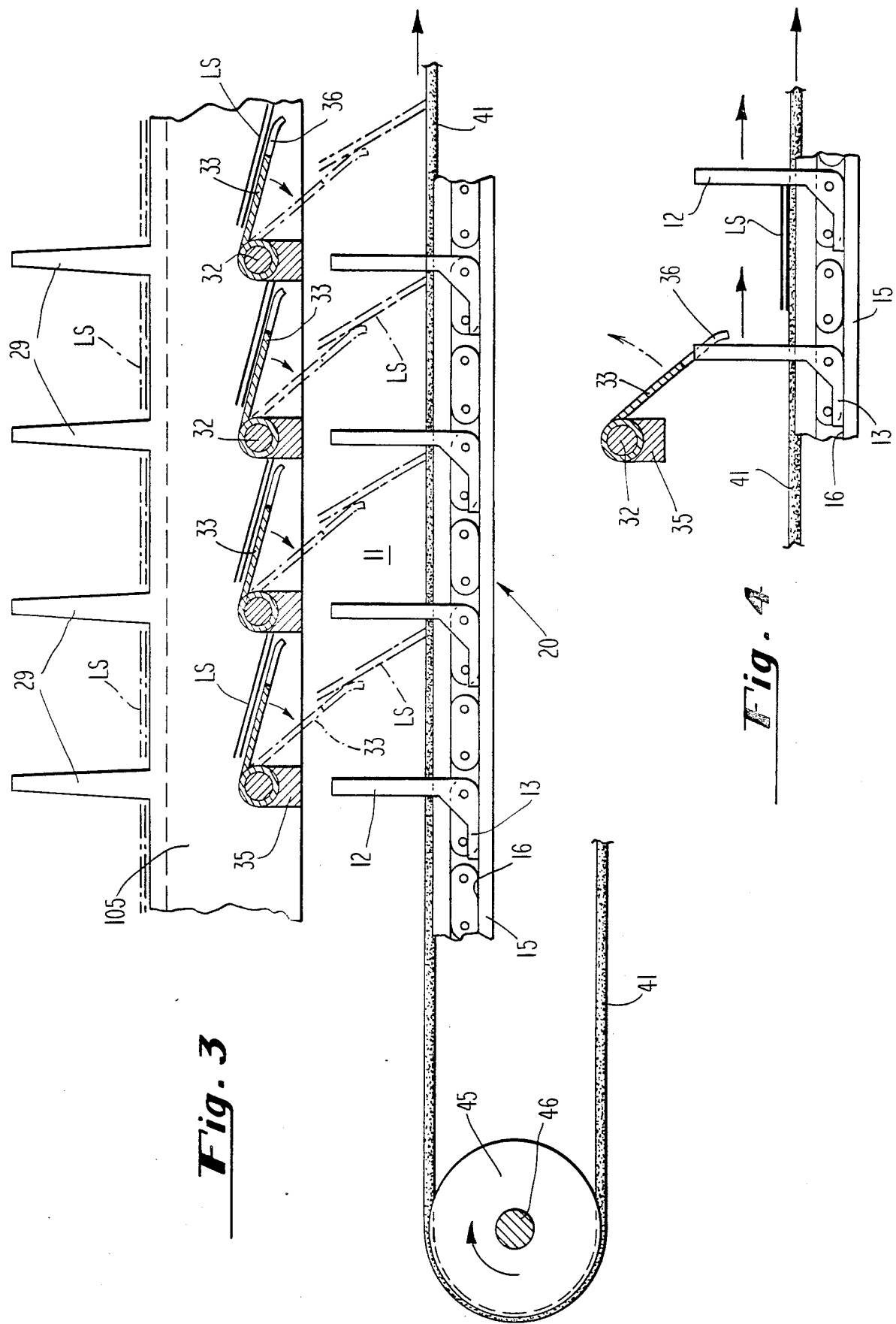

16
ORIENTATION SECTION OF PACKING APPARATUS

BACKGROUND OF THE INVENTION

This invention relates to apparatus for commercial production, assembling, and packaging of lasagna strips.

This invention to which the present application is directed relates particularly to an orientation section in which groups of U-shaped strips of lasagna carried by stick feeders through a long dryer are laid in parallel transversely across a conveyor at the exit end of the dryer.

Apparatus has been available in the prior art for commercial production of lasagna strips but the placing of the lasagna strips by the stick feeders in parallel relation across a flat conveyor for transport to the disc cutters has been a source of trouble in that the lasagna strips are easily dislodged from transverse parallel positions and as a consequence tend to pass through the disc cutters at an angle, resulting in a lasagna strip of parallelogram configuration rather than the desired rectangular shape. The parallelogram-shaped lasagna strips do not pass inspection and are returned.

SUMMARY OF THE INVENTION

In the commercial production of lasagna, a flour-and-water mix is extruded through a parallel series of orifices or dies to form a parallel series of continuous strips of pasta approximately two inches wide. In accordance with the present improvement, the parallel series of lasagna strips are passed through an orientation comb to assure that the strips are evenly spaced apart. The pasta strips are then cut into lengths of approximately four feet and hung at equal spacing over horizontally-disposed rods known as stick feeders. The series may, for example, comprise twenty-four strips, hung or suspended over a single stick feeder, with each of the U-shaped strips having legs of about equal length, i.e. about two-feet long. The stick feeders, of which there are many, are moved in succession at a slow rate along a serpentine path through a long dryer. The time of passage through the dryer may be of the order of forty-eight hours. At the exit end of the dryer, each stick feeder is successively lowered through a forwardly-projecting arcuate path and, in accordance with the present invention, the series or group of twenty-four suspended strips of lasagna are laid as a group horizontally across an orientation mechanism positioned above a transverse flight conveyor which is constantly moving. After laying the group of strips across the orientation mechanism, the stick feeder is withdrawn horizontally through the open end of the U-shaped strips. The orientation mechanism then transfers the lasagna to the flight conveyor and the strips of lasagna are transported forwardly toward a pair of spaced-apart disc cutters. The flight conveyor maintains the strips of lasagna in their intended transverse orientation as one disc cutter successively severs the closed end of the U-shaped strips and the other disc cutter successively severs the strips at their mid-points. As a result, each of the U-shaped lasagna strips is converted into two sets of two-layer rectangular lasagna strips positioned side-by-side on the conveyor. As the conveyor moves on, the sets are cammed apart by a camming separator. The flight conveyor then transports the spaced-apart sets of two-layer lasagna strips toward the next operation in which the lasagna strips are collected and stacked for packaging.

The principal object of the present invention is to provide, in an automatic commercial lasagna-making machine, an orientation mechanism for aligning and maintaining the parallel alignment of a series of lasagna strips which are delivered as a group by the stick feeders at the exit end of the dryer and which are to be transported by a conveyor to the disc cutters.

BRIEF DESCRIPTION OF THE DRAWING

FIG. 1 is a top plan view of an orientation mechanism according to the present invention, located at the exit end of the dryer.

FIG. 2 is an elevational view looking along the line 2—2 of FIG. 1 in the longitudinal direction of the conveyor.

FIG. 3 is a side elevational view looking along the line 3—3 of FIG. 1.

FIG. 4 is a view similar to that of a portion of FIG. 3 but illustrating the situation after the flight conveyor has moved forwardly following deposit thereon of the lasagna strips.

FIG. 5 is a side elevational view looking along the line 5—5 of FIG. 1.

DETAILED DESCRIPTION OF THE PREFERRED EMBODIMENTS

In the drawings, reference numerals 100 through 107 identify various frame members.

As seen in FIGS. 1 and 3, mounted on frame member 105 is an alignment comb comprised of a series of tapered guide posts 29 spaced apart in the lengthwise direction of the conveyor 20 to form channels into each of which a U-shaped lasagna strip is laid, thereby to assure the even spacing of the parallel strips laid as a group by the stick feeder at the exit end of the elongated oven.

In FIG. 2, one of the lasagna strips LS is shown in phantom being deposited by the stick feeder and also after it has been deposited by the stick feeder, with the closed or loop end of the U-shaped strip at the left.

In accordance with the present invention, instead of a flat belt conveyor, a flight conveyor 20 is used in which flights are defined by upstanding push fingers 12, best seen in FIG. 3.

As seen in FIG. 1, supported above flight conveyor 20 in alignment with the cross channels formed by the tapered guide posts 29 of the alignment comb, are shelves 33 for receiving and supporting the U-shaped lasagna strips which are laid down in parallel relation by the stick feeders. Each of the shelves 33 is mounted for pivotal tilting movement on a cross shaft 32. Secured to the cross shafts 32, at one side of the conveyor, are a series of levers 61, seen in FIG. 5. There is one lever 61 for each cross shaft. Pivotal movement of the levers 61, for example, the clockwise direction as viewed in FIG. 5, will cause corresponding rotational movement of the cross shafts 32 and tilting of the shelves 33.

As seen in FIG. 5, the levers 61 extend downwardly from the shafts 32. Mounted at the lower ends of the levers 61 are stub shafts 62 which carry cam followers 63 positioned within notches 53 of an actuator bar 52 which extends longitudinally along one side of the conveyor 20. Connected to the actuator bar 52 is a piston cylinder 51 which when actuated, pulls bar 52 in the direction of the arrow, i.e. to the left as shown in FIG.

5. In this movement, bar 52 is guided by guide pins 55 positioned within slots 54.

It will be seen from FIG. 5, that when the bar 52 is moved from right to left, as indicated by the arrow in FIG. 5, the right edges of the slots 53 push against the cam followers 63 and cause the levers 61 to move pivotally clockwise about their pivotal points which are at the center axis of the cross shafts 32. Thus, pivotal clockwise movement of the levers 61 cause rotational clockwise movement of the shafts 32, thereby causing the shelves 33 to move pivotally clockwise from their normal positions shown in solid line in FIG. 3. It is to be noted that in their normal positions the shelves 33 are slightly tilted in the clockwise direction. This assures that the lasagna strips LS on the shelves 33 will not slide off in the other direction. It is also to be noted that when the shelves 33 are in their normal positions, the lasagna strips LS rest against the retaining bars 35.

So long as the shelves 33 are not tilted from their normal positions, the lasagna strips LS, as just indicated, rest against and are prevented from falling off the shelves 33 by retaining bars 35. However, when the shelves 33 are tilted from their normal positions to the fully tilted positions, the lasagna strips LS start to slide down and off the shelves.

In accordance with the present invention, positioned below the shelves 33 is a transport conveyor 20 which is divided into a succession of narrow flights 11 by a succession of vertical push fingers 12. With conveyor 20 in motion, the delivery of the lasagna strips LS from the shelves 33 is timed by a timing shaft to occur when the flights 11 are in alignment with the shelves 33. Thus, when the shelves 33 are tilted to fully tilted position, each of the U-shaped lasagna strips starts to fall into one of the flights 11. The forward side edges of the U-shaped lasagna strips come into engagement with a pair of constantly moving friction belts 41 which are constantly moving at speed faster than the conveyor 20. When, as just mentioned, the forward side edges of the lasagna strips come into engagement with the friction belts 41, the lasagna strips are pulled by the belts 41 off the shelves 33. When the forward side edges of the lasagna strips come into contact with the push fingers 12 of the conveyor, their further forward movement is stopped. This is illustrated in FIG. 1. The high speed friction belts 41 may be driven by any suitable means. In FIG. 1, the belts 41 are disposed along a portion only of the conveyor 20 as shown at the left end of FIG. 1, and are shown trained over pulleys 45 mounted on a drive shaft 46 and driven by a drive pulley 44 and a drive belt 43.

After the flight conveyor 20 moves a preset distance following actuation in the DOWN direction of the tiltable shelves or "flippers" 33, control signals developed by the timing shaft call for the return of the bar 52 to the position shown in FIG. 5, thereby to allow the tilted shelves 33 to return to their normal or UP positions. As soon as bar 52 starts its return, the tension springs 65 pull the levers 61 pivotally counter-clockwise, thus keeping the cam followers 63 in contact with the forward edges of the notches 53 in the bar 52 as the bar 52 moves forwardly, from left to right in FIG. 3. The springs 65 are an important safety feature which allow an operator (person) to manually tilt an individual flipper 33 in the DOWN direction and yet prevent the flipper from having a strong clamping action in the UP or returned position, thereby preventing the operator from getting clamped and injured by the flipper closing on his or her hand.

Cut-outs 36 are provided in the shelves 33 at appropriate locations to avoid having following fingers 12 come into engagement with a tilted shelf 33 before the tilted shelf 33 has started to return or before it has sufficiently returned upwardly toward its normal position. This condition is illustrated in FIG. 4 where the upper end of the leftmost push finger 12 is shown moving through the cut-out 36 of the tilted shelf 33.

OPERATION

The machine is controlled by pulses generated by a timing shaft. When a group, for example, of twenty-four evenly spaced parallel U-shaped lasagna strips, carried by one of the stick feeders in its travel through the elongated dryer is lowered and laid down over the orientation mechanism positioned above flight conveyor 20, the lasagna strips are guided into their respective parallel evenly spaced positions by a comb comprising a series of tapered guide posts 29. Each of the U-shaped lasagna strips is laid on the top of one of the series of twenty-four narrow tiltable shelves or flippers 33.

During the laying of the lasagna strips on the tiltable shelves 33, the flight conveyor 20 is in motion. At the exact instant of perfect alignment of the flipper shelves 33 and the conveyor flights 11, signals are issued to drop the lasagna strips in front of the flight push fingers 12. This condition is illustrated in FIG. 3 of the drawing. As there shown in solid lines, each of the flippers or tiltable shelves 33, when in its normal non-tilted position, is at a slight downward incline in the forward direction of the conveyor 20. This assures that the lasagna strips do not slide off the shelves in the rearward direction. A series of retainer bars 35 act as stop members to prevent the lasagna strips from sliding forwardly off the shelves 33 when the shelves are in their normal non-tilted positions.

To tilt the shelves or flippers 33, a piston cylinder 51 is actuated to pull an actuator bar 52 rearwardly, toward the left as viewed in FIG. 5. In FIG. 5, the actuator bar 52 is shown in its extreme rightmost position. When the cylinder 51 is actuated to pull the actuator bar 52 rearwardly, levers 61 are pushed pivotally in clockwise direction, thereby rotating the shafts 32 in a clockwise direction and thereby moving the shelves or flippers 33 clockwise from their normal positions shown in solid lines in FIG. 3 to the tilted positions shown in phantom. When the shelves or flippers 33 are so tilted, the lasagna strips, of approximately the same narrow width as that of the shelves in the narrow direction of the shelves as shown (except as to cut-out portions 36), start to slide down into the positions shown in phantom in FIG. 3. As soon as the leading side edges of the U-shaped lasagna strips come into engagement with the constantly moving high speed friction belts 41, located beneath the shelves in their DOWN positions an amount less than the width of a lasagna strip in the narrow direction as shown in FIG. 3, the lasagna strips are pulled off the shelves 33 and pulled forwardly (to the right as shown in FIG. 3) until the leading edges come into contact with the forward push fingers 12 and with the trailing edges still in engagement with shelves as shown in phantom in FIG. 3. Continued movement of the belt 41 as shown in FIGS. 3 and 4 causes the trailing edges of lasagna strips to then leave the shelves with the lasagna strips falling into horizontal positions on belt 41 as shown in full lines in FIG. 4. Almost immediately, the tilted shelves or flippers 33 are returned counter-clockwise to their original non-tilted positions for reloading with lasagna.

The shelves 33 are provided with cut-out portions 36 to assure that the following push fingers 12 clear the shelves 33 even though the shelves have not returned sufficiently from their tilted positions. This situation is illustrated in FIG. 4 of the drawing, where the following or leftmost push finger 12 is shown passing through the cut-out 36. In FIG. 4, the rapidly moving friction belts 41 have maintained the lasagna strips up against the lead or right-most push finger 12. Subsequently down the line, the friction belts 41 will drop down and move away from the flight conveyor and the lasagna strips. At that time, the following push fingers 12 will move up and push against the rearward edges of the lasagna strips. In functioning as pushers, the fingers 12, although mounted for pivotal movement on the conveyor chain, are prevented from moving pivotally by the short leg 13 which bears against shoulder 16 of frame member 15.

It will be seen from the foregoing description that the orientation mechanism assures that when a group of evenly-spaced parallel U-shaped lasagna strips are laid down by the stick feeder at the exit end of the dryer, the lasagna strips are first deposited on tiltable shelves mounted above the moving conveyor and thereafter deposited in flights of a flight conveyor. In this manner parallel transverse positions of the lasagna strips are maintained on the conveyor as the U-shaped lasagna strips are carried into the disc cutters.

In the operation of the apparatus, the main conveyor flights are continuously counted, and the flippers or shelves are actuated on every count of twenty-five, which (with no zero) corresponds to the passage of twenty-four conveyor flights under the flipper section. This drops twenty-four pieces of lasagna on the main conveyor with no gaps in the main conveyor between the last piece of the previous "drop" and the first piece of the next "drop".

Timing for the flipper or shelf motion, both DOWN and UP, is obtained from the timing shaft which controls the motion of the main conveyor chain. At the same time that the flippers or shelves are actuated, the lasagna stick feeder delivery system is started, causing a stick feeder to lay a group of lasagna strips on the shelves, and the next stick feeder to be moved into position near the shelf section.

The cycle just described is repeated so long as the machine is running.

What is claimed is:

1. An orientation mechanism for use as a section of an article handling apparatus for handling article strips of a predetermined narrow dimension between opposite edges, said orientation mechanism comprising:
   a. a transport conveyor divided into a succession of narrow transverse flights defined by upwardly projecting spaced-apart push fingers;
   b. a series of narrow shelves that have at least some portions that are approximately the width of the strips in the narrow direction, the shelves being positioned in a generally horizontal plane above said transport conveyor for receiving and supporting narrow strips;
   c. a plurality of pivotal shafts positioned transversely relative to said transport conveyor;
   d. means mounting each of said shelves to one of said pivotal shafts;
   e. means for pivoting said shafts to tilt said shelves to DOWN positions, thereby to cause strips on said shelves to slide down toward the flights of said transport conveyor;
   f. friction belt means positioned below said shelves in the DOWN position of the shelves a distance less than the dimension of the strip in the direction of conveyance on the friction belt means;
   g. drive means for moving said friction belt means in the forward direction of said transport conveyor at a speed greater than that of said conveyor, and together with said shelves comprising means whereby leading edges of said strips from said shelves in DOWN positions come into engagement with said friction belt means while still being engaged by said shelves, for pulling strips forwardly by said friction belt means to the forward limits of said flights, and off said shelves, whereby trailing edges of the strips fall down with the strips falling into horizontal positions in said flights; wherein said shelves are provided with cut-out means in lengthwise alignment with said push fingers to allow passage therethrough of said push fingers.

2. Apparatus according to claim 1 wherein said means for pivoting said pivotal shafts to tilted positions includes levers connected to said shafts and projecting downwardly therefrom, and means for moving said levers pivotally.

3. Apparatus according to claim 2 wherein said means for moving said levers pivotally include a slide bar having notches therein, cam follower means in said notches connected to the lower ends of said levers, and means for moving said slide bar.

4. Apparatus according to claim 3 wherein spring means are connected to said levers for biasing said levers in a direction to maintain said shelves in their normal UP positions.

5. Apparatus according to claim 1 wherein said mounting means are at the rearward edge of said shelves.

6. Apparatus according to claim 1 wherein said shelves in their normal non-tilted UP positions are inclined slightly downward in the forward directions and wherein retainer means are provided for retaining strips on said shelves.

7. Apparatus according to claim 4 wherein said shelves in their normal non-tilted UP positions are inclined slightly downward in the forward directions and wherein retainer means are provided for retaining strips on said shelves.

8. Apparatus according to claim 5 wherein said shelves in their normal non-tilted UP positions are inclined slightly downward in the forward directions and wherein retainer means are provided for retaining strips on said shelves.

9. Apparatus according to claim 1, wherein the shelves are normally maintained in their generally horizontal UP positions by spring means biasing them in their UP positions.

10. Apparatus according to claim 1, including means for simultaneously and transversely delivering a plurality of strips onto a corresponding plurality of shelves; said means for delivering comprising a generally horizontally disposed stick feeder, longitudinally oriented in a direction parallel to that of the movement of the friction belt means and transversely moveable across the shelves at a height just above the shelves for delivering strips thereto and withdrawal therefrom.

11. Apparatus according to claim 1, wherein the friction belts are disposed along only a portion of the conveyor.

12. Apparatus according to claim 1, wherein said shelves have the same spacings as the conveyor flights.

13. Apparatus according to claim 1, wherein said friction belt means comprise a plurality of transversely spaced-apart friction belts.

* * * * *